United States Patent
Yen et al.

(10) Patent No.: US 8,138,929 B2
(45) Date of Patent: Mar. 20, 2012

(54) METHOD FOR PROTECTING DATA IN NON-VOLATILE STORAGE DEVICE AND COMPUTER THEREOF

(75) Inventors: Hung-Wei Yen, Taipei (TW);
Chih-Hsiung Lin, Taipei (TW);
Jing-Rung Wang, Taipei (TW)

(73) Assignee: Pegatron Corporation, Taipei (TW)

( * ) Notice: Subject to any disclaimer, the term of this patent is extended or adjusted under 35 U.S.C. 154(b) by 404 days.

(21) Appl. No.: 12/471,109

(22) Filed: May 22, 2009

(65) Prior Publication Data
US 2009/0289803 A1 Nov. 26, 2009

(30) Foreign Application Priority Data
May 26, 2008 (TW) ................................ 97119305 A

(51) Int. Cl.
*G08B 17/00* (2006.01)
(52) U.S. Cl. .................... 340/584; 361/103; 365/211
(58) Field of Classification Search ............ 340/584, 340/599; 307/117; 361/103, 106; 365/211
See application file for complete search history.

(56) References Cited

U.S. PATENT DOCUMENTS

| | | | |
|---|---|---|---|
| 4,278,970 A * | 7/1981 | Streczyn et al. ............. | 340/599 |
| 5,612,677 A * | 3/1997 | Baudry ........................ | 340/584 |
| 6,496,346 B1 * | 12/2002 | Bruckner ..................... | 361/103 |
| 6,829,128 B2 * | 12/2004 | Gower et al. ................ | 361/103 |
| 7,333,314 B2 * | 2/2008 | Yamaji et al. ................ | 361/103 |
| 7,742,353 B2 * | 6/2010 | Chen et al. .................. | 365/211 |

FOREIGN PATENT DOCUMENTS

| | | |
|---|---|---|
| CN | 1381784 A | 11/2002 |
| TW | 456099 B | 9/2001 |
| TW | 573762 U | 1/2004 |
| TW | 594466 B | 6/2004 |
| TW | M243705 U | 9/2004 |
| TW | I267727 B | 12/2006 |

\* cited by examiner

*Primary Examiner* — John A Tweel, Jr.
(74) *Attorney, Agent, or Firm* — Morris Manning & Martin LLP; Tim Tingkang Xia, Esq.

(57) ABSTRACT

The invention discloses a method for protecting data in a non-volatile storage device and a computer thereof. The computer includes a non-volatile storage device, a temperature sensing unit, and a controller. The temperature sensing unit is disposed at the non-volatile storage device to sense a sensed temperature of the non-volatile storage device and to compare the sensed temperature with a predetermined temperature. The controller is coupled with the temperature sensing unit. When the sensed temperature is higher than the predetermined temperature, the controller makes the computer enter into a hibernation state.

17 Claims, 3 Drawing Sheets

METHOD FOR PROTECTING DATA IN NON-VOLATILE STORAGE DEVICE AND COMPUTER THEREOF

BACKGROUND OF THE INVENTION

1. Field of the Invention

The invention relates to a technique for protecting data in a non-volatile storage device and, more particularly, to a method for avoiding loss of data in a non-volatile storage device caused by high operating temperature of the non-volatile storage device and a computer thereof.

2. Description of the Prior Art

Since a hard disk drive can store a great amount of data, it has become the main storage hardware of a computer.

At present, to allow a user to remove, replace, or carry the hard disk drive at any time, most hard disk drives have a removable case to house the hard disk drive, respectively. However, during the operation of the hard disk drive, the motor rapidly rotates to produce a large amount of heat thus to increase the temperature of the hard disk drive. The hard disk drive disposed in the removable case will be disposed in the high temperature after a long time.

If the hard disk drive is disposed in the high temperature for a long time, the main body of the computer may be crashed, and more seriously the hard disk drive may be unable to be repaired because of physical damage. Thus, the data stored in the hard disk drive may also be lost.

SUMMARY OF THE INVENTION

One objective of the invention is to provide a method for protecting data in a non-volatile storage device and a computer thereof.

To achieve the objective of the invention, the embodiment of the invention provides a computer. The computer includes a non-volatile storage device, a temperature sensing unit, and a controller. The temperature sensing unit is disposed at the non-volatile storage device to sense a sensed temperature of the non-volatile storage device and to compare the sensed temperature with a predetermined temperature. The controller is coupled with the temperature sensing unit. When the sensed temperature is higher than the predetermined temperature, the controller makes the computer enter into a hibernation state. In the hibernation state, original system states of the computer are stored in the non-volatile storage device.

The invention further provides a method for protecting data in a non-volatile storage device. The method is used in a computer. The embodiment of the method includes the following steps. First, a sensed temperature of a non-volatile storage device is sensed. Then the sensed temperature is compared with a predetermined temperature. When the sensed temperature is higher than the predetermined temperature, the computer enters into a hibernation state. In the hibernation state, original system states of the computer are stored in the non-volatile storage device.

To sum up, in the embodiment of the invention, when it is determined that the sensed temperature of the non-volatile storage device is higher than the predetermined temperature, the computer enters into the hibernation state to reduce the temperature of the non-volatile storage device. Thus the non-volatile storage device can be protected, and loss of the user data can be avoided.

These and other features, aspects, and advantages of the present invention will become better understood with regard to the following description, appended claims, and accompanying drawings.

BRIEF DESCRIPTION OF THE APPENDED DRAWINGS

DETAILED DESCRIPTION OF THE INVENTION

Figure 1:
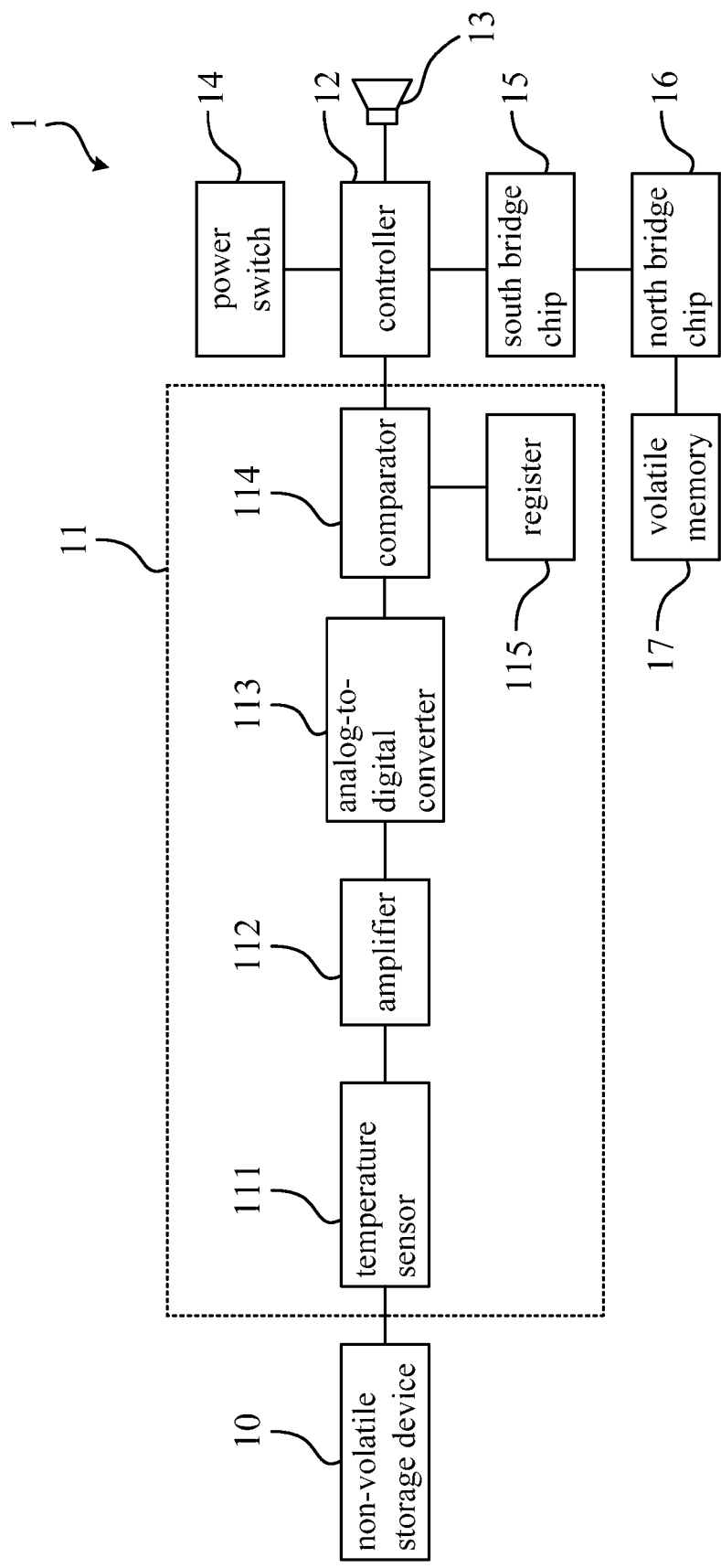
FIG. 1 is a control block diagram of a computer according to a preferred embodiment of the invention.

FIG. 1 is a control block diagram of a computer according to a preferred embodiment of the invention. In FIG. 1, in the embodiment, a computer 1 includes a non-volatile storage device 10, a temperature sensing unit 11, a controller 12, a buzzer 13, a power switch 14, a south bridge chip 15, a north bridge chip 16, and a volatile memory 17.

The controller 12 is coupled with the temperature sensing unit 11, the buzzer 13, the power switch 14, and the south bridge chip 15, respectively. The north bridge chip 16 is coupled with the south bridge chip 15 and the volatile memory 17, respectively.

In the embodiment, the non-volatile storage device 10 is a hard disk drive (HDD). In the other embodiments, the non-volatile storage device 10 may also be a solid-state drive (SSD), a hybrid hard disk drive (HHDD), or any other similar storage devices. In the embodiment, the controller 12 is an embedded controller (EC). In the other embodiments, the controller 12 may be a super input/output chip or a microprocessor. In the embodiment, the controller 12 is coupled with the south bridge chip 15 by a low pin count (LPC) bus.

Figure 2:
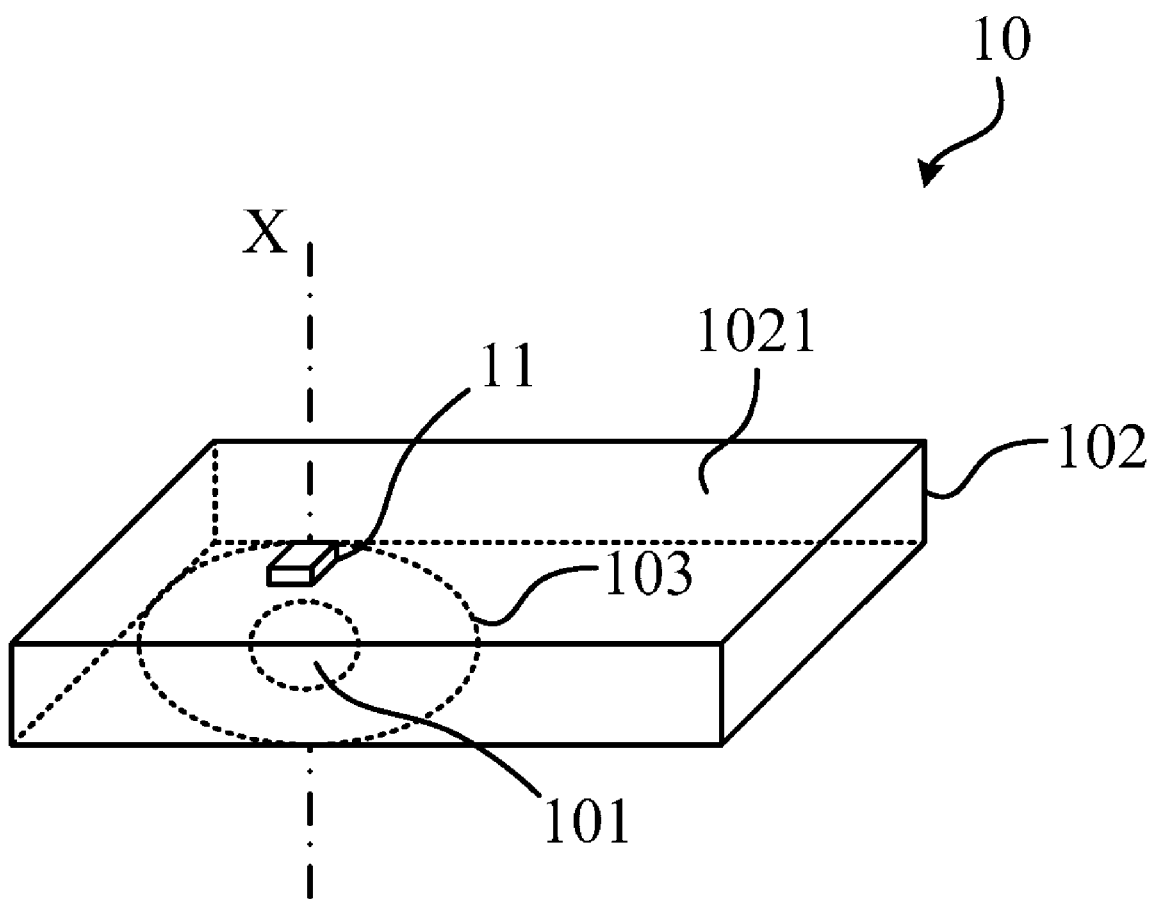
FIG. 2 is a three-dimensional diagram showing connection of a non-volatile storage device and a temperature sensing unit according to a preferred embodiment of the invention.

FIG. 2 is a three-dimensional diagram showing connection of a non-volatile storage device and a temperature sensing unit according to a preferred embodiment of the invention. In FIG. 2, in the embodiment, the non-volatile storage device 10 is a hard disk drive including a motor 101, a case 102, and a disk 103. The temperature sensing unit 11 is disposed at an external surface 1021 of the case 102, and it is located at a rotating axis X to be adjacent to the motor 101. After persons having ordinary skill in the art have fully known the invention, they can know that the temperature sensing unit 11 can also be disposed at the other positions of the non-volatile storage device 10. For example, the temperature sensing unit 11 may be disposed at an internal surface of the case 102. The invention is not limited thereto.

During the operation of the non-volatile storage device 10, the motor 101 starts and drives the disk 103 to rapidly rotate around the rotating axis X. With increase of the operating time of the non-volatile storage device 10, the motor 101 produces a large amount of heat and becomes a heating source, and thus the temperature of the non-volatile storage device 10 gradually increases. In the embodiment, the temperature sensing unit 11 is disposed at the external surface 1021 of the case 102 and at the rotating axis X to be adjacent to the motor 101 thus to obtain a sensed temperature of the non-volatile storage device 10.

In FIG. 1, in the embodiment, the temperature sensing unit 11 includes a temperature sensor 111, an amplifier 112, an analog-to-digital converter (ADC) 113, a comparator 114, and a register 115.

The temperature sensor 111 senses the sensed temperature of the non-volatile storage device 10. The amplifier 112 and the analog-to-digital converter 113 convert the sensed temperature to a digital signal and transmit the digital signal to the comparator 114.

When the comparator 114 receives the digital signal transmitted from the analog-to-digital converter 113, the comparator 114 compares the digital signal with a predetermined temperature stored in the register 115 and controls the controller 12 to operate according to the comparison result. For example, when the value of the digital signal is greater than the value of the predetermined temperature, the comparator 114 outputs a control signal at a low level to the controller 12.

After the controller 12 receives the control signal at the low level, the controller 12 executes an instruction in a specific address. The controller 12 controls an operating system of the computer to make the computer 1 enter into a hibernation state (S4) by the south bridge chip 15. The operating system may be a windows operating system. At the same time, the controller 12 drives the buzzer 13 to emit a warning sound. When the value of the digital signal is less than that of the predetermined temperature, the comparator 114 outputs a control signal at a high level to the controller 12. According to the control signal at the high level, the controller 12 controls the computer 1 to maintain normal operation by the south bridge chip 15.

In the other embodiments, the value of the predetermined temperature may also be stored in a storage device such as a static random access memory (SRAM) or a memory. In the embodiment, the value of the predetermined temperature in the temperature sensing unit 11 can be adjusted by software. For example, an initial setting of the predetermined temperature is 60° C., and the predetermined temperature can be adjusted to be 70° C. by a basic input/output system (BIOS).

The windows operating system widely used at present has generally integrated a power management function of an advanced configuration and power interface (ACPI) standard. The ACPI standard can be used to control power management operation of related hardware of a computer system.

A typical ACPI standard specification defines six different power states as follows.

S0: This is a normal power supply state.

S1: In the state, a monitor and a disk drive are powered off, while a central processing unit (CPU), a memory, and a fan are still powered.

S2: In the state, besides the monitor and the disk drive, the CPU and the cache memory are also powered off.

S3: This is also called suspend to RAM (STR). In the STR state, the memory including a frame buffer, a main memory, and so on is continually powered, while the other parts in the computer are powered off. As mentioned in the ACPI standard specification file, the S3 state is substantially similar to the S2 state, and the difference is that in the S3 state, more hardware is powered off. Compared with the aftermentioned S4 state, the S3 state has two advantages. First, it is fast to return to full speed operation in the S3 state. Second, the S3 state is safer. Sometimes, a user's application and operation belongs to private secret data, and the user does not hope to store the data back to the hard disk drive. At that moment, the STR state is suitable for use.

S4: In the state, data of a computer during operation including the data in the frame buffer, the main memory, a disk buffer, and so on are all written back to the hard disk drive. Then the computer is powered off. The S4 state, as compared with the S3 state, is more power-saving (the premise is that the S4 state is not frequently entered into or exited from and there is a time interval between entering into the S4 state and exiting from the S4 state). However, the speed of entering into or exiting from the S3 state is faster than that of the S4 state.

S5: In the state, the computer is in a normal shutdown state, and external alternating current (AC) still provides power for the computer.

In the embodiment, when the sensed temperature of the non-volatile storage device 10 is higher than the predetermined temperature, the controller 12 informs the operating system about making the computer 1 enter into the S4 state. Then the non-volatile storage device 10 stops operating thus to reduce the temperature. At the same time, all data and original system states in the volatile memory 17 (such as a RAM) are stored in the non-volatile storage device 10.

When the user presses the power switch 14, the controller 12 transmits a wake-up signal to inform the operating system by the south bridge chip 15, making all information before the S4 state stored in the non-volatile storage device 10 unchangeably written into the original positions. Thus, the computer system before the hibernation state is consistent with that after the hibernation state.

Figure 3:
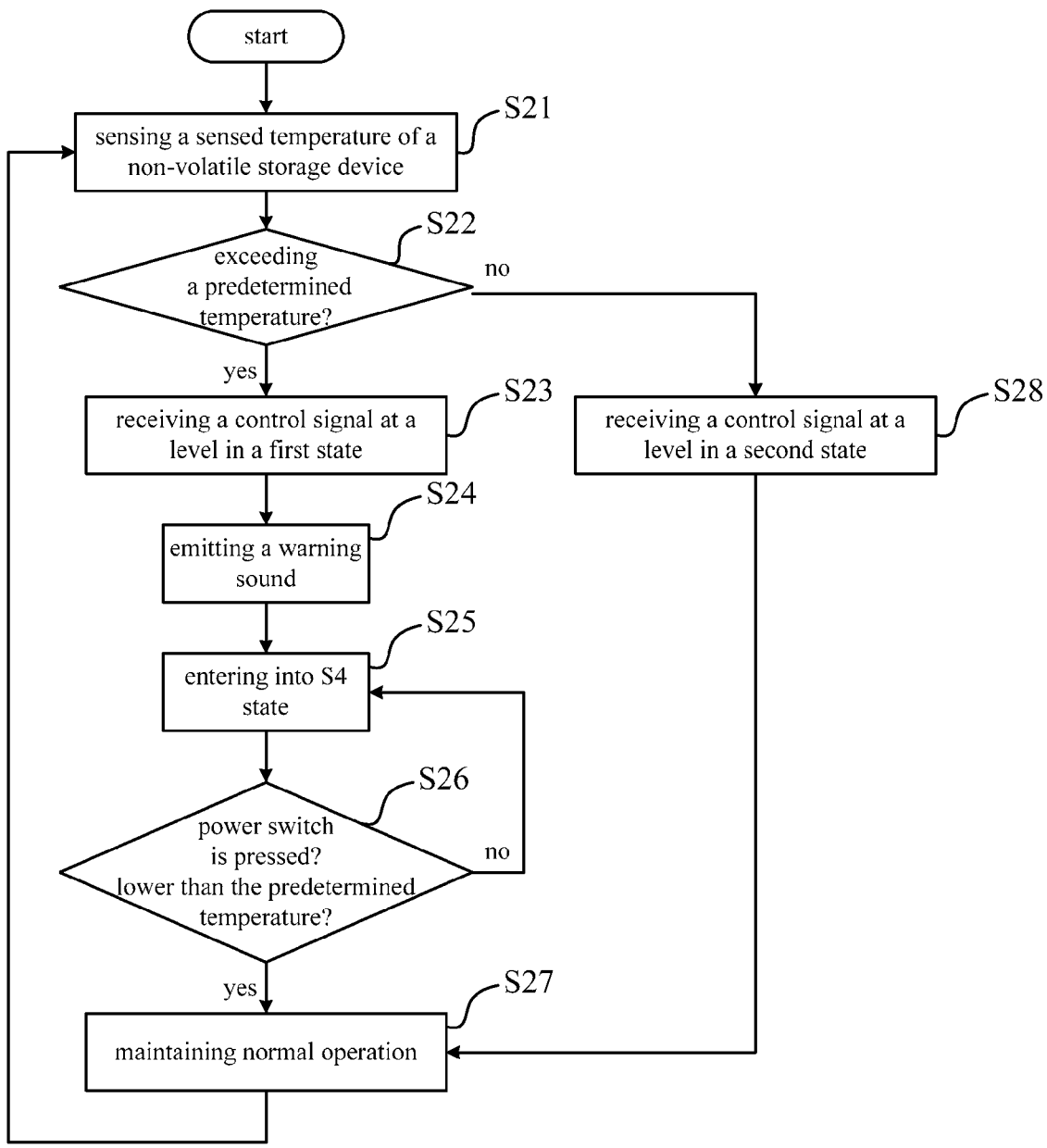
FIG. 3 is a flowchart of a method for protecting data in a non-volatile storage device according to a preferred embodiment of the invention.

FIG. 3 is a flowchart of a method for protecting data in a non-volatile storage device according to a preferred embodiment of the invention. Please refer to FIG. 1 and FIG. 3 together. First, the temperature sensing unit 11 assembled on the external surface of the non-volatile storage device 10 senses the sensed temperature of the non-volatile storage device 10 (step S21).

Afterwards, the temperature sensing unit 11 compares the sensed temperature of the non-volatile storage device with the predetermined temperature set in the temperature sensing unit 11 beforehand. The predetermined temperature may be 60 degrees (step S22).

If the temperature sensing unit 11 determines that the sensed temperature of the non-volatile storage device 10 is higher than the predetermined temperature, the controller 12 receives a control signal at a level in a first state transmitted from the temperature sensing unit 11 (step S23). In the embodiment, the level in the first state is a low level, and the first state represents that the sensed temperature of the non-volatile storage device 10 exceeds the predetermined temperature. The controller 12 controls the buzzer 13 to emit a warning sound (step S24). At the same time, the controller 12 executes a predetermined code (an instruction in a specific address) according to the received control signal at the low level, and it informs the operating system of the computer 1 about making the computer 1 enter into the hibernation state S4 by the south bridge chip 15 (step S25). In the state, all data and original system states in the volatile memory 17 of the computer 1 are stored in the non-volatile storage device 10.

After the computer 1 enters into the S4 (suspend to disk, STD) state, the non-volatile storage device 10 and the system are powered off. Thereby, the temperature of the non-volatile storage device 10 is reduced to protect the data in the non-volatile storage device 10 (such as a hard disk drive).

If the temperature sensing unit 11 determines that the sensed temperature of the non-volatile storage device 10 is lower than the predetermined temperature, the controller 12 receives the control signal at a level in a second state transmitted from the temperature sensing unit 11 (step S28). In the embodiment, the level in the second state is a high level, and the second state represents that the sensed temperature of the non-volatile storage device 10 is lower than the predetermined temperature. At that moment, the controller 12 maintains normal operation, and the computer 1 also maintains normal operation (step S27).

As described above, after the computer 1 enters into the S4 state, the computer 1 always maintains the S4 state. When the user presses the power switch 14 (or called a power button) again, according to the control signal, the controller 12 determines whether the sensed temperature of the non-volatile storage device 10 sensed by the temperature sensing unit 11 is lower than the predetermined temperature (step S26).

If the power switch 14 is pressed and the controller 12 determines that the sensed temperature sensed by the temperature sensing unit 11 is still higher than the predetermined temperature, the computer 1 maintains the S4 state (step S25).

If the power switch 14 is pressed and the controller 12 determines that the sensed temperature sensed by the temperature sensing unit 11 is lower than the predetermined temperature, a wake-up event is triggered to wake the computer 1 up from the hibernation state, and the computer 1 continues operating normally (step S27). Thereby, the user can continue doing the work before the hibernation state. Afterwards, as stated in step S21, the sensed temperature of the non-volatile storage device 10 continues being sensed.

To sum up, in the computer and the method for protecting the data in the non-volatile storage device thereof according to the embodiments of the invention, when it is determined that the sensed temperature of the non-volatile storage device exceeds a predetermined temperature, at that moment, the temperature of the non-volatile storage device is too high, and the computer is not suitable to continue operating. The controller makes the computer enter into the hibernation state (S4). Thus, the temperature of the non-volatile storage device can be reduced to protect the non-volatile storage device and the stored data. At the same time, when the computer enters into the hibernation state, the operating states of the present operating devices and the data of the memory are stored in the non-volatile storage device. Therefore, when the user presses the power switch, the computer can quickly return to the state before the hibernation state thus to protect the non-volatile storage device and to avoid loss of the data in the user's work.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer comprising:
   a non-volatile storage device;
   a temperature sensing unit disposed at the non-volatile storage device, for sensing a sensed temperature of the non-volatile storage device and comparing the sensed temperature with a predetermined temperature; and
   a controller coupled with the temperature sensing unit, when the sensed temperature is higher than the predetermined temperature, the computer enter into a hibernation state and original system states of the computer are stored in the non-volatile storage device in the hibernation state,
   wherein the non-volatile storage device is a hard disk drive comprising a case and a motor installed in the case, and the temperature sensing unit is disposed at an external surface of the case and is adjacent to the motor.

2. The computer according to claim 1, wherein the temperature sensing unit outputs a control signal, and the controller determines whether to inform an operating system of the computer about making the computer enter into the hibernation state according to the control signal.

3. The computer according to claim 2, wherein when the sensed temperature is higher than the predetermined temperature, a level of the control signal is in a first state, and the controller informs the operating system of the computer about making the computer enter into the hibernation state.

4. The computer according to claim 3, wherein when the sensed temperature is lower than the predetermined temperature, the level of the control signal is in a second state, and the computer maintains normal operation.

5. The computer according to claim 1, wherein the predetermined temperature is stored in the temperature sensing unit.

6. The computer according to claim 1, wherein the predetermined temperature can be adjusted by a basic input/output system (BIOS) of the computer.

7. The computer according to claim 1, further comprising a south bridge chip, wherein the controller is coupled with the south bridge chip, and the controller makes the computer enter into the hibernation state by the south bridge chip.

8. The computer according to claim 1, wherein the controller is an embedded controller, a super input/output chip, or a microprocessor.

9. The computer according to claim 1, wherein the computer further comprises a buzzer coupled with the controller, and when the temperature of the non-volatile storage device is higher than the predetermined temperature, the controller drives the buzzer to emit a warning sound.

10. A computer comprising:
    a non-volatile storage device;
    a temperature sensing unit disposed at the non-volatile storage device, for sensing a sensed temperature of the non-volatile storage device and comparing the sensed temperature with a predetermined temperature;
    a controller coupled with the temperature sensing unit, when the sensed temperature is higher than the predetermined temperature, the computer enter into a hibernation state and original system states of the computer are stored in the non-volatile storage device in the hibernation state; and
    a power switch coupled with the controller, wherein when the power switch is pressed and the sensed temperature of the non-volatile storage device is lower than the predetermined temperature, the controller wakes the computer up from the hibernation state.

11. The computer according to claim 10, wherein the temperature sensing unit outputs a control signal, and the controller determines whether to inform an operating system of the computer about making the computer enter into the hibernation state according to the control signal.

12. The computer according to claim 11, wherein when the sensed temperature is higher than the predetermined temperature, a level of the control signal is in a first state, and the controller informs the operating system of the computer about making the computer enter into the hibernation state.

13. The computer according to claim 12, wherein when the sensed temperature is lower than the predetermined temperature, the level of the control signal is in a second state, and the computer maintains normal operation.

14. The computer according to claim 10, wherein the predetermined temperature is stored in the temperature sensing unit.

15. The computer according to claim 10, wherein the predetermined temperature can be adjusted by a basic input/output system (BIOS) of the computer.

16. The computer according to claim 10, further comprising a south bridge chip, wherein the controller is coupled with the south bridge chip, and the controller makes the computer enter into the hibernation state by the south bridge chip.

17. The computer according to claim 10, wherein the controller is an embedded controller, a super input/output chip, or a microprocessor.

* * * * *